United States Patent [19]

Feller

[11] 4,346,864

[45] Aug. 31, 1982

[54] MEANS AND METHOD FOR MOUNTING TEMPERATURE SENSORS

[75] Inventor: Murray F. Feller, Dunnellon, Fla.

[73] Assignee: Wilgood Corporation, Jacksonville, Fla.

[21] Appl. No.: 209,157

[22] Filed: Nov. 21, 1980

[51] Int. Cl.³ .................. A47B 96/00; G01K 1/14
[52] U.S. Cl. .................. 248/231; 236/DIG. 6; 248/DIG. 4; 374/147; 374/209
[58] Field of Search .............. 73/374, 346, 362.8; 236/DIG. 6, DIG. 12; 248/542, DIG. 4, 231

[56] References Cited

U.S. PATENT DOCUMENTS

| | | | |
|---|---|---|---|
| 1,902,932 | 3/1933 | Zubaty | 236/DIG. 6 |
| 2,047,801 | 7/1936 | Russell | 73/374 X |
| 2,114,071 | 4/1938 | Chaney et al. | 73/374 |
| 2,302,640 | 11/1942 | Schmidt | 73/374 |
| 2,636,240 | 4/1953 | Pokorny | 73/374 X |
| 2,979,586 | 4/1961 | Siri | 236/DIG. 6 |
| 2,979,650 | 4/1961 | Godshalk et al. | 338/28 X |
| 3,177,717 | 4/1965 | Oveson | 73/374 X |

*Primary Examiner*—Daniel M. Yasich

[57] ABSTRACT

The disclosed apparatus comprises a sheet-metal strap having a strip portion that can be threaded through a slot in the strap so that a loop is formed to encircle a temperature sensor having pipe-encircling portions extending oppositely from the loop generally as a "figure-8", providing parallel heat conduction paths between the pipe and the temperature sensor. Extremities of the strap can be drawn toward each other, thereby developing tension about the temperature sensor and the pipe; and the extremities can be folded with each other as a means for tensioning the sheet-metal member against the temperature sensor and the pipe and for securing the strap in place under tension.

11 Claims, 7 Drawing Figures

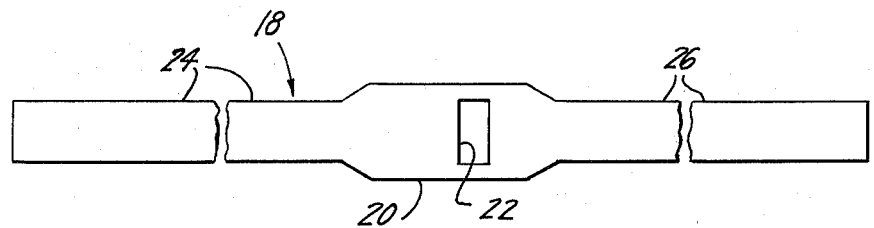
FIG.1
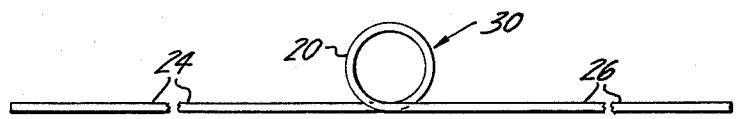
FIG.2
FIG.3
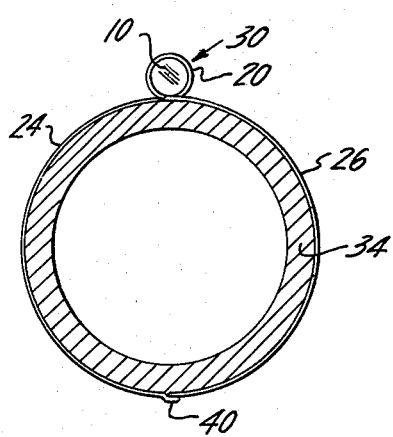
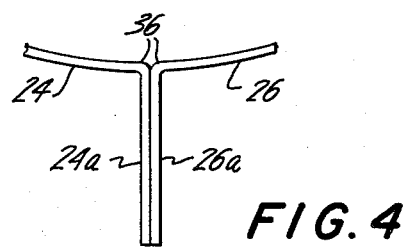
FIG.4
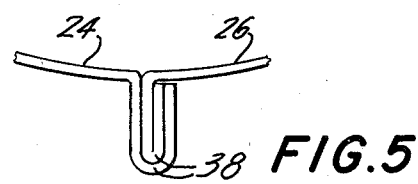
FIG.5
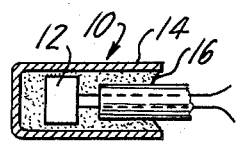
FIG.7
FIG.6

MEANS AND METHOD FOR MOUNTING TEMPERATURE SENSORS

The present invention relates to the mounting of a temperature sensor on a pipe which, for example, forms part of a heating system or an air-conditioning system. Temperature sensors may be mounted both at the inlet to a heat exchanger and at its outlet, for various monitoring purposes.

An object of the present invention resides in the provision of a novel economical yet highly effective mounting device for a temperature sensor, and in the provision of a novel combined mount and temperature sensor that affords close thermal coupling between a pipe and the temperature sensor, and in the provision of a novel method of mounting a temperature sensor on a pipe.

The illustrative and presently preferred exemplary embodiment of the invention comprises a sheet-metal strap having a first strip portion that can be threaded through an aperture in the strap, thereby to form a loop to encircle a temperature sensor and to provide oppositely extending portions that can extend about the pipe, in "FIG.-8" fashion. When opposite extremities of the sheet-metal member extend around a pipe and are drawn toward each other, the sheet-metal strap becomes tensioned about the temperature sensor and about the pipe, promoting effective heat-transfer between the pipe and the sensor. As a more detailed aspect of the invention, when the extremities of the elongated metal member are brought together and folded, the desired tension can be generated and fastening can be effected without resort to screws or other fastening devices.

An equipment manufacturer may perform the initial steps of threading the strip portion of the strap through the aperture to form a loop, inserting a temperature sensor in the loop, and tightening the loop about the temperature sensor for promoting efficient heat conduction from the strap to the temperature sensor. Bonding material may be used for securing these parts in that relationship. The metal portions of the strap serve as heat conductors at both ends of the loop, in this way serving more effectively than in arrangements relying on only one heat-conduction path between the temperature sensor and the pipe whose temperature is to be monitored.

The novel mounting strap has the further advantage that, where the user performs all of the steps of forming the loop, inserting the temperature sensor, and applying these to a pipe, one and the same operation of tensioning the strap around the pipe is also operative to tension the loop around the temperature sensor.

Merely tightening the strap around the pipe brings an extended area of the strap into close heat-transfer relation to the pipe. However, bringing the end portions of the strap together and subjecting them to bending operations can be done in a manner that develops tension in the strap. Tension serves to sustain stable and effective heat transfer between the pipe and the strap—and between the strap and the temperature sensor too—despite differential expansions of the involved materials at the different temperatures in the range of operation and despite different thermal coefficients of expansion.

The novel mounting strap will be recognized as having many advantages and attributes. It is at once highly effective for its intended purpose, low in cost, and easy to use. The assembly is mechanically stable and neat in appearance.

The nature of the invention including the foregoing and other objects, novel aspects and features, advantages and some alternatives, will be fully appreciated from the following detailed description of an illustrative embodiment which is shown in the accompanying drawing forming part of the disclosure.

In the drawings:

FIG. 1 is a plan view of a novel sensor-mounting strap;

FIG. 2 is a side elevation of the strap of FIG. 1 after an initial forming step;

FIG. 3 is a side elevation of the mounting strap of FIG. 1 including a temperature sensor mounted on a pipe;

FIGS. 4, 5 and 6 are enlarged fragmentary views of end portions of the novel strap in progressive stages of formation to completion.

FIG. 7 is an enlarged longitudinal cross-section of a temperature sensor forming part of the assembly of FIG. 3.

In FIG. 7, an illustrative temperature sensor 10 is seen to include a temperature-variable resistor 12, for example, contained in a cylindrical metal cup 14 and secured in place by a potting compound 16. The materials of cup 14 and potting compound 16 are chosen for excellence in heat conductivity, e.g. aluminum and glass-filled epoxy, respectively. Sensor 10 in an example is cylindrical, $\frac{1}{4}$ inch in diameter by $\frac{1}{2}$ inch long.

Strap 18 is of sheet metal, especially a high thermal-conductivity metal such as aluminum or copper. It includes a relatively broad medial portion 20 having a slot 22 near one end, a first strip portion or strip 24 and a second strip portion or strip 26 extending integrally from the medial portion 20. For example, strap 18 is 0.010 inch thick copper, 5 inches long, medial portion is $\frac{3}{8}$ inch wide by 1 inch long, and strips 24 and 26 are each $2\frac{1}{2}$ inches long by 0.4 inch wide. Slot 22 is slightly longer than the width of strip portion 24.

In use, strip 24 is looped up and threaded down through slot 22, then drawn to the left to form loop 30.

In this condition of strap 18, the temperature sensor 10 can be inserted into loop 30, the loop pulled tight against the outside cylindrical surface of the sensor, and these parts can be united by suitable bonding cement. However, the strap has special value where the sensor is inserted into the loop when the strap is being used as a mount on pipe 34, as follows.

After loop 30 has been formed, oversize as compared to the sensor, strips 24 and 26 are wrapped around pipe 34. End portions 24a and 26a of those strips are pulled together, tightening the strips against the pipe in forming bends 36 (FIG. 4). Bends 38 are formed such that the ends of strips 24 and 26 (or one of them) bears against strip 26. Then the bent assembly 40 is folded against strip 26. (The bent assembly 40 shown enlarged in FIG. 6 also appears in FIG. 3 where the scale is much smaller.) This procedure involves the potential of enormous leverage being developed to impose substantial tension in the strap, not only around pipe 34 but also around temperature sensor 10. The tension has the effect of assuring firm contact of the strips 24 and 26 against the pipe and firm contact of medial portion 20 against sensor 10 despite differential changes of dimension of the secured strap, pipe 34 and sensor 10, such changes arising due to temperature changes and different thermal coefficients of expansion.

The strap is usable with a wide range of pipe sizes and diameters of sensor 10. Heat transfer between the pipe and the sensor is efficient both because of the easily attainable tightness of the strap against the surfaces of the pipe and the sensor, and because of heat conduction between loop 30 and each of strips 24 and 26.

After the mounting procedure is complete, the pipe and the temperature sensor are wrapped with heat insulation to promote sensor 10 attaining as nearly as possible the same temperature as the fluid in the pipe.

It is evident that end portions 24a and 26a could be secured together in various alternative ways, as by twisting them together or by means of a screw-and-nut arrangement, or otherwise. However the illustrative example that utilizes bends has been found effective, economical, easily performed, and neat, and it is readily modified for use with various diameters of pipe up to a maximum for any length of strap 18.

Those skilled in the art will readily recognize alternative details, modifications and varied application of the illustrative embodiment of the invention in its various aspects. Consequently, the invention should be construed broadly in accordance with its true spirit and scope.

What is claimed is:

1. Means for mounting a temperature sensor on a pipe, comprising a sheet-metal strap having a medial portion and first and second integral portions extending oppositely from said medial portion, said first integral portion being elongated to constitute a first strip, said medial portion being wider than said strip and having an aperture therein through which said strip can be threaded so that the strip forms a loop for encircling the temperature sensor and said first and second integral portions of the strap extend oppositely from said medial portion for encircling a pipe whose temperature is to be sensed, said integral portions having end portions remote from said medial portion which are adapted to be drawn toward each other and secured together with said strap tensioned about the temperature sensor and about the pipe in "FIG.-8" configuration.

2. Means for mounting a temperature sensor as in claim 1 in combination with the temperature sensor, one of said integral portions encircling said temperature sensor and extending through said aperture, whereby said strap forms a loop about said temperature sensor and forms a "FIG.-8" when said first and second integral portions encircle a pipe with both said first and second portions acting as conductors of heat between said temperature sensor and the pipe.

3. The mounting means as in claim 1, wherein said second integral portion of said sheet-metal strap is also greatly elongated to form a strip extending from said medial portion, and wherein end portions of said strips remote from said medial portion are adapted to be folded together to constitute means for tensioning and securing said mounting member about the temperature sensor and the pipe.

4. The apparatus of either of claims 1 or 2, wherein said second integral portion of said sheet-metal strap is also greatly elongated to form a strip extending from said medial portion.

5. The combination of a temperature sensor and a mounting means therefor as in claim 2, wherein said second integral portion of said sheet-metal strap is also greatly elongated to form a strip extending from said medial portion, and wherein end portions of said strips remote from said medial portion are adapted to be folded together to constitute means for tensioning and securing said mounting member about the temperature sensor and the pipe.

6. The method of mounting a temperature sensor on a pipe for heat transfer therebetween utilizing the mounting means as in claim 1 wherein said first strip has been threaded through said aperture to form a loop around the temperature sensor, including the steps of encircling a pipe with said integral portions of the sheet-metal strap, drawing end portions of said integral portions toward each other to tension portions of the strap around the pipe, and securing said end portions against tension-releasing separation.

7. The method as in claim 6 wherein the securing and tensioning steps are performed by drawing said end portions together and subjecting them to common strap-tensioning and securing deformations.

8. The method as in either of claims 6 or 7, wherein said second integral portion of said mounting strap is greatly elongated to constitute a second strip.

9. The method of mounting a temperature sensor on a pipe for heat transfer therebetween utilizing the mounting means as in claim 1, including the steps of threading said first strip through said aperture and thereby forming a loop and inserting the temperature sensor in the loop, encircling a pipe with said integral portions of the sheet-metal strap, drawing end portions of said integral portions toward each other to tension portions of the strap around the pipe, and securing said end portions against tension-releasing separation.

10. The mounting means as in claim 1, wherein said second integral portion of the sheet-metal strap is also greatly elongated to form a second strip extending from said medial portion, end portions of said strips being adapted to be drawn toward each other for tensioning said mounting member about both the temperature sensor and the pipe.

11. The method of mounting a temperature sensor on a pipe for heat transfer therebetween utilizing the mounting means of claim 1, including the steps of threading said first strip through said aperture and thereby forming a loop, inserting the temperature sensor in the loop, bending said integral portions of the sheet-metal strap along the pipe circumferentially, drawing end portions of said integral portions toward each other about the pipe to tension portions of the strap around the pipe and to tension the loop around the temperature sensor, and securing said end portions against tension-releasing separation.

* * * * *